(12) United States Patent
Mason, Jr. et al.

(10) Patent No.: US 6,611,896 B1
(45) Date of Patent: Aug. 26, 2003

(54) DYNAMIC MIRROR SERVICE POLICY WITH SEEK ADJUSTMENT IN A NON-PHYSICAL MIRRORED STORAGE ENVIRONMENT

(75) Inventors: Robert S. Mason, Jr., Mendon, MA (US); Eitan Bachmat, Lehavim (IL); Tao Kai Lam, Boston, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/382,752

(22) Filed: Aug. 25, 1999

(51) Int. Cl.$^7$ .......................... G06F 12/00; G06F 12/16
(52) U.S. Cl. .......................... 711/114; 710/18; 711/112; 711/162
(58) Field of Search .......................... 710/18; 709/105; 711/5, 111, 112, 114, 161, 162; 714/6

(56) References Cited

U.S. PATENT DOCUMENTS

| | | | |
|---|---|---|---|
| 5,239,649 A | 8/1993 | McBride et al. | |
| 5,974,515 A | 10/1999 | Bachmat et al. | |
| 6,061,761 A | * 5/2000 | Bachmat | 709/105 |
| 6,088,766 A | 7/2000 | Bachmat et al. | |
| 6,112,257 A | 8/2000 | Mason, Jr. et al. | |
| 6,189,071 B1 | 2/2001 | Bachmat | |
| 6,237,063 B1 | 5/2001 | Bachmat et al. | |
| 6,397,292 B1 | 5/2002 | Venkatesh et al. | |
| 6,405,284 B1 | * 6/2002 | Bridge | 711/114 |

* cited by examiner

*Primary Examiner*—Matthew Kim
*Assistant Examiner*—Woo H. Choi
(74) *Attorney, Agent, or Firm*—Daly, Crowley & Mofford, LLP

(57) ABSTRACT

A mechanism for adjusting seek activity in a data storage system of physical devices having mirrored logical volumes is presented. Statistics describing at least reading data from the mirrored volumes during successive time periods are collected. From the collected statistics an activity level associated with each of the mirrored logical volumes is determined. Seek activity values for the physical devices are computed based on the activity levels associated with the logical volumes stored on each of the physical devices. The computed seek activity values relate a physical device seek activity to the activity level associated with, and distance between, the mirrored logical volumes residing the physical devices. The computed seek values are used to minimize seek activity for non-mirrored ones of the physical devices.

27 Claims, 7 Drawing Sheets

DYNAMIC MIRROR SERVICE POLICY WITH SEEK ADJUSTMENT IN A NON-PHYSICAL MIRRORED STORAGE ENVIRONMENT

BACKGROUND OF THE INVENTION

The invention relates generally to data storage systems, and in particular, to data storage systems in which data is stored on mirrored logical volumes.

Various techniques have been developed for increasing the reliability of data storage systems and to protect against failure due to data loss. One such technique is data mirroring, which involves the storage of two or more copies of the data, preferably on different storage devices. A data storage having mirrored data operates to maintain all copies up to date. Typically, there are two copies.

In a typical data storage system, each physical device, such as a disk storage device, may have a format that defines a number of units, and the units may correspond to logical volumes. Each logical volume appears to the host computer or computers to be a separate storage device and, therefore, operations take place with regard to the logical volume as if it were a physical volume. Typically, the physical devices are configured as mirrored pairs, with each physical device in the pair storing corresponding copies of logical volumes. Such a data storage system is said to employ both mirrored physical devices and mirrored logical copies.

Some logical volumes are accessed for read and/or write operations substantially more often than other logical volumes, and the nature of the operations can vary from random accesses to sequential accesses during any particular sequence of read or write operations. As a result, with larger storage devices, the risk of having concurrent jobs, each pertaining to a relatively small file (local activity) interfering with each other's activity increases. The use of striping techniques further increases the risk. Depending upon the nature and frequency of the read and write operations to a storage device containing many logical volumes, the disk read/write heads may be severely worked and the access time can, on average, be increased if sequential read and write locations are not located near one another.

One prior solution sets a mirror service policy, statically or preferably dynamically (as described in U.S. application Ser. No. 08/936,122, filed Sep. 24, 1997, issued as U.S. Pat. No. 6,112,257 on Aug. 29, 2000, and entitled "Dynamic Adjustment of Mirror Service Policy for Logical Volumes in a Disk Drive System Based on Collected Statistics," the contents of which are incorporated herein, by reference), in an attempt to optimize the reading and writing of data. Such a policy may, for example, assume that most data transfers are sequential in nature, or that they are random. The policies can include, for example, interleaved, mixed, dedicated, or other policies that appear, after reviewing the manner in which a storage device is, or is to be, used, to provide the best average access time to the data.

One such policy is to only service requests that fall within the first half of a logical volume on one of a mirrored pair of physical devices and the requests to the second half of the logical volume on the other, mirrored physical device. Another policy might be to only service requests that fall in odd groups with a group being defined in terms of a number of blocks. For instance the first group (blocks 0–959) will be serviced by copy 1 and the next group by copy 2, etc. These policies, when implemented statically, are limited because the policies are chosen at system configuration time and never change. A dynamic mirror policy can substantially improve performance as the policies for the system change periodically.

Once a policy to service each logical volume is determined, the approach described in the U.S. Pat. No. 6,112,257 attempts to optimize seeks fur the logical volumes on the same physical devices. There may, however, be circumstances that require greater flexibility in configuring the physical devices for logical volumes, or it may become necessary or desirable to transfer data in a logical volume from one of the mirrored physical devices to a third device, thus destroying the mirroring at the physical device level. The existing seek optimization described in the U.S. Pat. No. 6,112,257, which is based on physical mirrors, will be ineffective in maintaining seek balances under such circumstances.

SUMMARY OF THE INVENTION

This invention relates to seek adjustment in a data storage system of physical devices having mirrored logical volumes.

In an aspect of the invention, statistics describing at least reading data from the mirrored volumes during successive time periods are collected and an activity level associated with each of the mirrored logical volumes is determined from the collected statistics. Seek activity values for each of the physical devices are then computed based on the activity levels associated with the logical volumes on the physical devices and used to minimize seek activity for non-mirrored ones of the physical devices.

Embodiments of the invention may include one or more of the following features.

The computed seek activity values computed for the physical devices may relate a physical device seek activity to the activity level associated with, and distance between, the mirrored logical volumes residing the physical devices.

The computed seek activity values may be used to minimize seek activity for non-mirrored ones of the physical devices in the following manner. A sum of the computed seek activity values is computed. At least one simulated mirror policy change based on the computed sum of the computed seek activity values is performed. The sum of the computed seek activity values are recomputed using the results of the at least one mirror policy change. If the recomputed sum of the seek activity values is determined to be less than the computed sum of the seek activity values, then at least one simulated mirror policy change is implemented.

At least one simulated mirror policy change may be made by selecting a most active one of the physical devices based on the computed seek activity values, selecting a most active one of the logical volumes residing on the selected most active one of the physical devices based on the associated-activity level, modifying a mirror policy associated with the selected one of the logical volumes to reduce the seek activity value for the selected one of the physical devices and recomputing the seek activity values for the selected one of the physical devices and another one of the physical devices which stores a mirrored copy of the most active one of the logical volumes.

At least one simulated policy change may include a plurality of simulated policy changes. The plurality of simulated policy changes may be repeated a predetermined number of times.

The use of the seek activity values to minimize seek activity for non-mirrored ones of the physical devices may repeat until a predetermined time interval has expired or, alternatively, until the recomputed sum is zero.

The recomputed sum may include a factor equal to an average of the activity levels of the logical volumes.

The seek adjustment mechanism of the invention offers several advantages. It provides for both device-specific seek reduction as well as seek balancing in a data storage system that employs non-physical mirroring techniques. To minimize seeks for a physical device in such a non-physical mirrored environment, the seek adjustment mechanism uses a seek function that takes into account the activity levels of and distances between the logical volumes residing on the physical device. At the same time, the mechanism determines the impact that a particular mirror policy change will have on storage devices other than the two storage devices involved in that mirror policy change. It does so by examining mirror policy changes likely to follow (predicted future policy changes) and determining if there is continued improvement in overall seek reduction over the course of those predicted future changes.

BRIEF DESCRIPTION OF THE DRAWINGS

Other features and advantages of the invention will be apparent from the following description taken together with the drawings in which.

DETAILED DESCRIPTION

Figure 1:
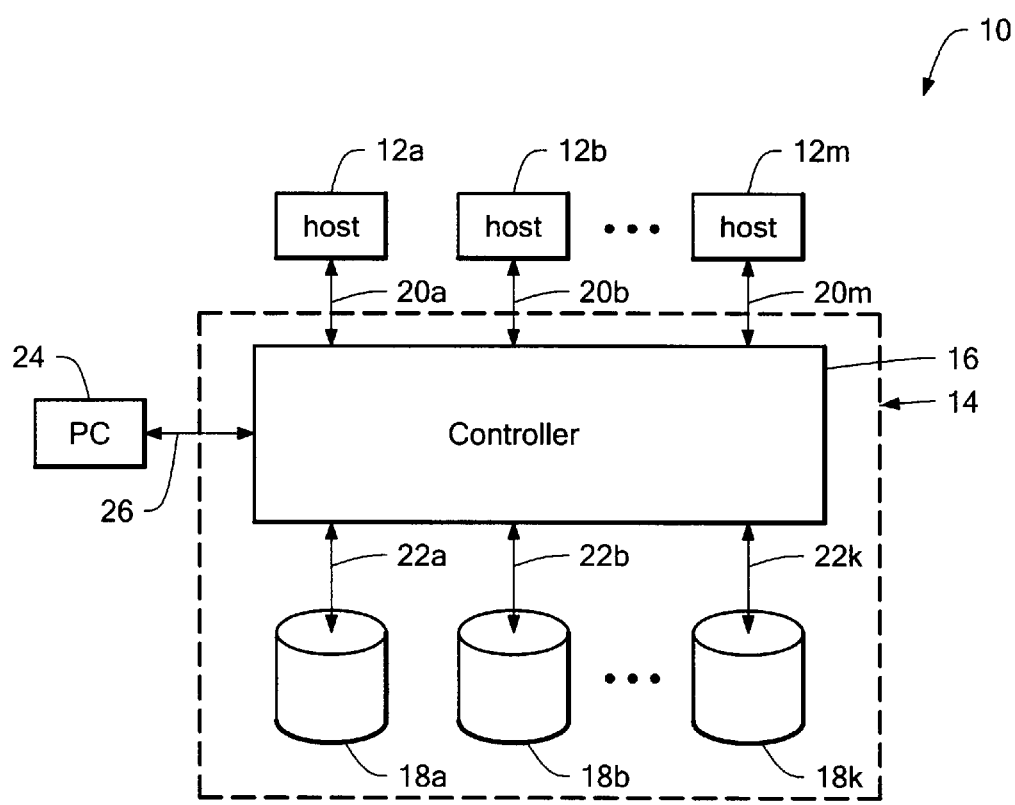
FIG. 1 is a block diagram of a data storage system in which the invention can be employed.

Referring to FIG. 1, a data processing system 10 includes a plurality of host computers 12a, 12b, . . . , 12m, connected to a data storage system 14. The data storage system 14 receives data and commands from, and delivers data and responses to, the host computers 12. The data storage system 14 is a mass storage system having a controller 16 coupled to a plurality of physical storage devices (or, simply, physical devices) shown as disk storage devices 18a, 18b, . . . , 18k. The controller 16 interconnects the host computers 12 and the physical devices 18, and can be, for example, that made by EMC and known as the Symmetrix controller. The controller 16 thus receives memory write commands from the various host computers over buses 20a, 20b, . . . , 20m, respectively, for example, connected and operated in accordance with a SCSI protocol, and delivers the data associated with those commands to the appropriate physical devices 18 over respective connecting buses 22a, 22b, . . . 22k. Buses 22 also preferably operate in accordance with a SCSI protocol. The controller 16 also receives read requests from the host computers 12 over buses 20, and delivers requested data to the host computers 12, either from a cache memory of the controller 16 or, if the data is not available in cache memory, from the physical devices 18.

Each of the physical devices 18 is logically divided, in accordance with known techniques, into a plurality of units. While typically one unit represents a logical volume, when a logical volume is striped across several physical devices, a unit will store only a fraction of a logical volume. There can be a plurality of units, for example 4, 8, or more units, on a physical device. In a typical configuration, the controller 16 also connects to a console PC 24 through a connecting bus 26. Console PC 24 is used for maintenance and access to the controller 16 and can be employed to set parameters of the controller 16 as is well known in the art.

Figure 2:
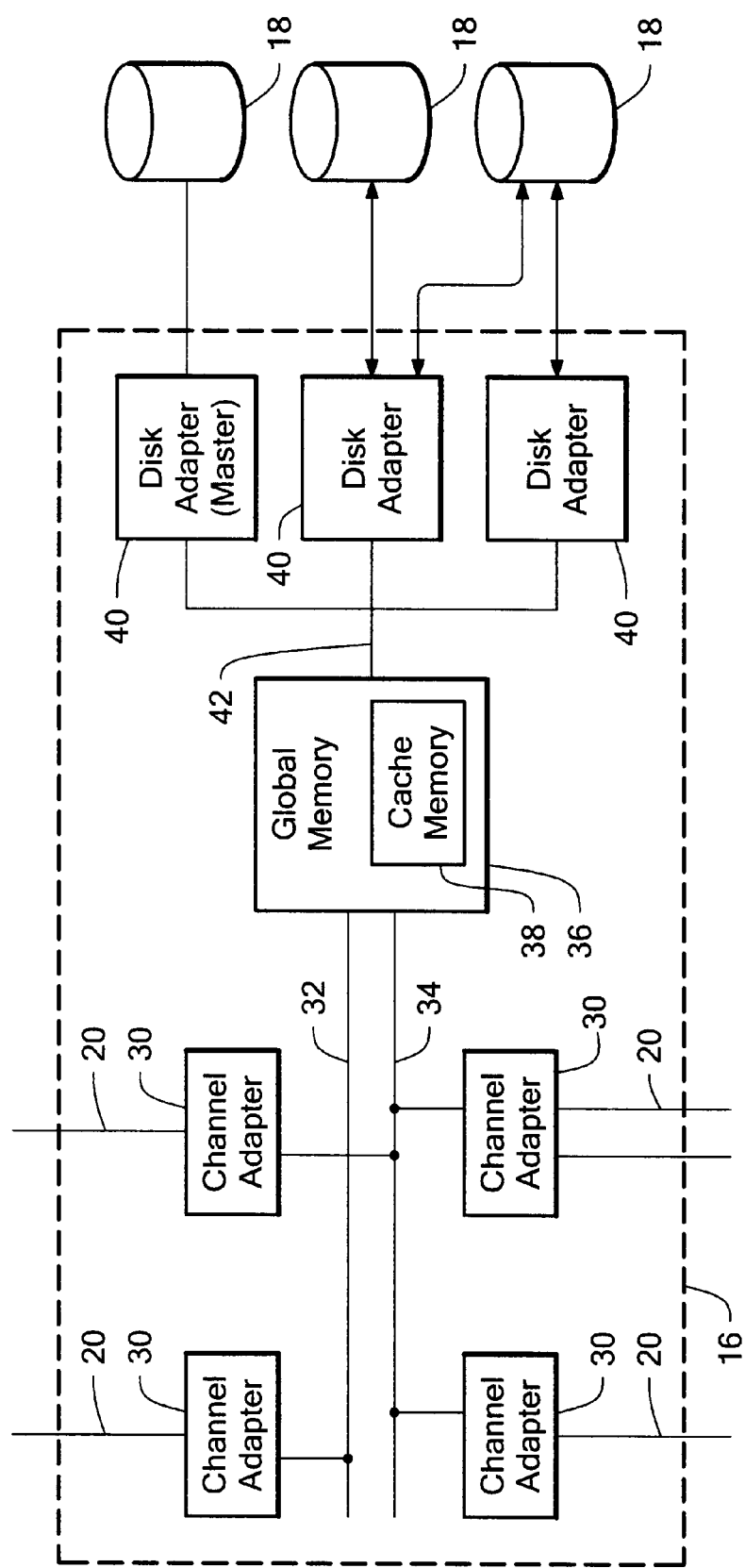
FIG. 2 is a detailed block diagram of the disk controller shown in FIG. 1.

In operation, the host computers 12a, 12b, . . . send, as required by the applications they are running, commands to the data storage system 14 requesting data stored in the logical volumes or providing data to be written to the logical volumes. Referring to FIG. 2, and using the EMC Symmetrix controller as an illustrative example, the communications from the host computer 12 typically connects to a port of a plurality of channel adapters 30 over the SCSI bus lines 20. Each channel adapter, in turn, connects over one or more system busses 32 or 34 to a global memory 36. The global memory 36 is preferably a large memory through which the channel adapter 30 can communicate to the physical devices 18 and can include a cache memory 38. Also connected to the global memory 36 are a plurality of device adapters shown as disk adapters 40, which control the physical devices 18. The disk adapters 40 also communicate with the global memory 36 over, preferably, SCSI busses 42. During a write operation, the disk adapters 40 read data stored in the global memory 36 by a channel adapter 30 and write that data to the logical volumes for which they are responsible. During a read operation and in response to a read command, the disk adapters 40 read data from a logical volume and write that data to global memory for later delivery by the channel adapter to the requesting host.

As is known in the art, mirrors of logical volumes may be maintained in conjunction with mirrors of physical devices. The logical volume mirrors are copies of each other and the physical device mirrors are copies of each other. For example, if there are two mirrored physical devices M1 and M2, four mirrored logical volumes A, B, C, D and M1 stores logical volumes A through D only, then M2 stores logical volumes A through D only. It is also possible to support logical volume mirrors on non-mirrored physical devices. In such a non-physical mirrored configuration, all of the corresponding mirrored copies of the logical volumes stored on one of the non-mirrored physical devices will not reside together on a different physical device. An example of a "non-physical" mirrored arrangement (i.e., logical volume mirrors stored on non-mirrored physical devices) is later shown in FIG. 7.

With reference to the data storage system 14, it is assumed that mirroring exists at the logical volume level, but not necessarily at the physical device level. Typically, for purposes of this embodiment, paired logical volume copies are employed and it is assumed that each unit stores a logical volume. The controller 16 can then respond to a read request by reading from either of the logical volume copies or mirrors stored in the physical devices 18.

Accordingly, there is implemented in the controller 16, and among the disk adapters 40, a mirror service policy which identifies which of the device adapters 40 is primarily responsible for reading in response to requests from a host computer. This policy could be fixed at the beginning of a system set up, taking into account the expected loads. Preferably, however, the mirror service policy implementation is dynamic. That is, the mirror service policy can be modified, periodically, in response to statistics describing the nature of the read and write requests to the data storage system 14, to change the mirror service policy during the operation of the data storage system 14.

An example of a dynamic mirror service policy (DMSP) is described in the above-referenced U.S. application Ser. No. 08/936,122. Over a given time period, data access information is collected. At the end of the period, a decision is made for each logical volume about the best policy to use for it. Logical volumes with higher access rates receive more attention than volumes with lower access rates. The information collected includes access rates for both read and write operations and how sequential the accesses were during the time period. Many factors are included in the policy decisions. These factors include: the activity level of the physical devices involved, the activity level of the disk adapters involved, and how sequential the accesses were. Also, information about the relationships between the different logical volumes that use the same mirrored physical devices is used to perform seek minimization.

However, in a data storage system (such as the data storage system 14 of the present embodiment) in which the mirrors of logical volumes do not necessarily reside on mirrored physical devices, it is desirable, also, to ensure load balancing over the non-mirrored physical devices. To that end, in addition to the existing seek function described in the above-referenced patent application, the controller 16 is suitably adapted to perform a seek minimization operation to adjust seek activity in a data storage system in which the logical volumes, but not the physical devices, are mirrored.

Figure 3:
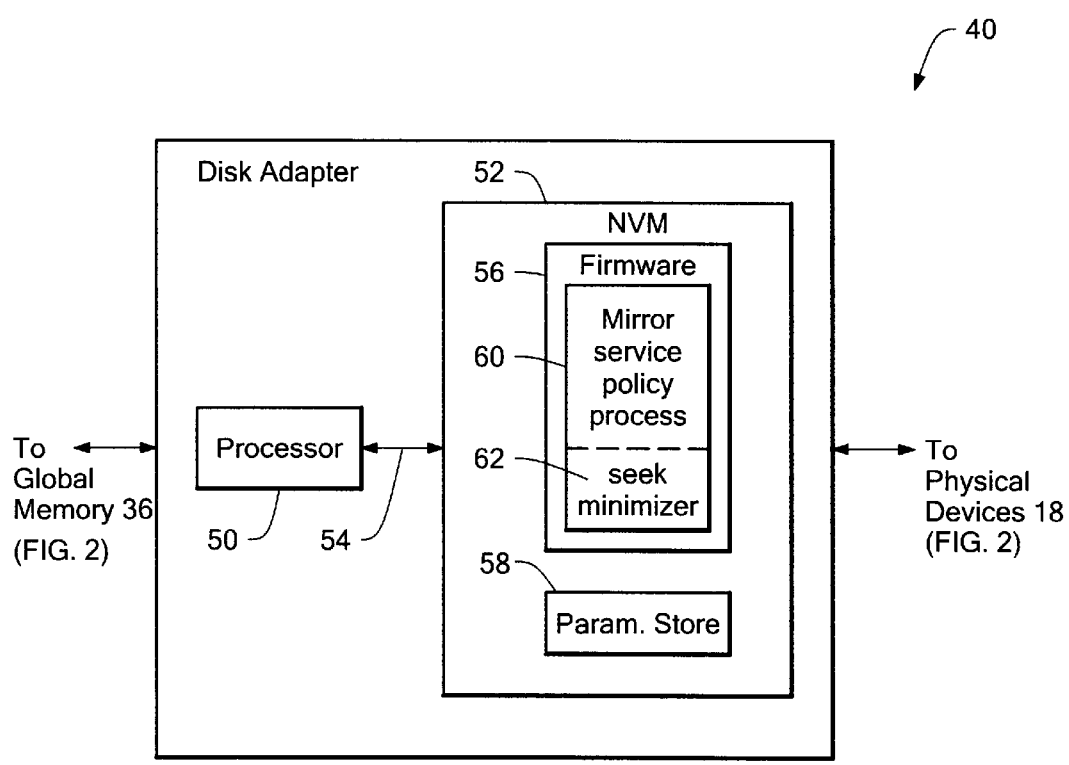
FIG. 3 is a block diagram of the disk adapter shown in FIG. 2.

As shown in FIG. 3, each disk adapter 40 includes a processor 50 coupled to a local, nonvolatile memory (NVM) 52 by an internal bus 54. The processor 50 controls the overall operations of the disk adapter and communicates with the local memory 52. The local memory 52 stores firmware 56 and parameter data, such as the DMSP table, in a parameter store 58, and is read each time the data storage system 10 is initialized. Included as a component of the firmware 56 is a mirror service policy process 60, which is copied to the processor's internal RAM (or external RAM, not shown), at initialization for subsequent execution by the processor 50. The mirror service policy process includes a DMSP decision process and seek optimization for logical/physical mirror arrangements like that discussed above and as further described in the above-referenced U.S. application Ser. No. 08/936,122. In addition, the mirror service policy process 60 includes a seek minimizer 62, which provides seek adjustment functionality to a non-physical mirrored data storage environment, as described below. The disk adapter 40 may include more than one processor 50 for parallel or distributed processing within a particular disk adapter.

Although not shown, it will be understood by those skilled in the art that the disk adapter 40 will include I/O interface logic, as well as bus and control logic. In addition, the disk adapter 40 may include transmit/receive buffers for temporarily storing data to be transferred to and received from the global memory 36.

The seek minimizer 60 employs a seek function to estimate seek activity for each physical device in the data storage system. The seek function is given by $$S = \left[ 1/2 \sum_{i=1}^{n} \sum_{j=1}^{n} a_i a_j |i-j| \right] \bigg/ \sum_{k=1}^{n} a_k \qquad \text{Eq. (1)}$$

where n is the number of logical volumes on the physical device, $a_i$ is the weighted activity for ith logical volume and $|i-j|$ is a measure of the distance between a pair of logical volumes on the physical device. The weighted activity is as defined in the above-reference U.S. application Ser. No. 08/936,122. The seek function of Eq. (1) therefore provides an indication of seek activity (the total weighted distance of seeks on a physical device) and assumes that the number of seeks performed to a given physical device is related to the weighted activity $a_i$ of the logical volumes and the distance between such logical volumes.

It is desirable to minimize to the extent possible the seek time over all of the physical devices $D_f$ by solving for each seek function $S_f$ and minimizing the sum of the seek functions, i.e., $\Sigma S_f$, where f=1, 2, ... k, and k is the number of physical devices. It may be noted, however, that, while the ultimate goal may be to reduce the seek function sum to zero, that is, each call for information to the data storage devices is handled by a different physical device, in practice it is rarely achievable since the number of units or logical volumes is typically much larger than the number of physical devices.

Figure 4:
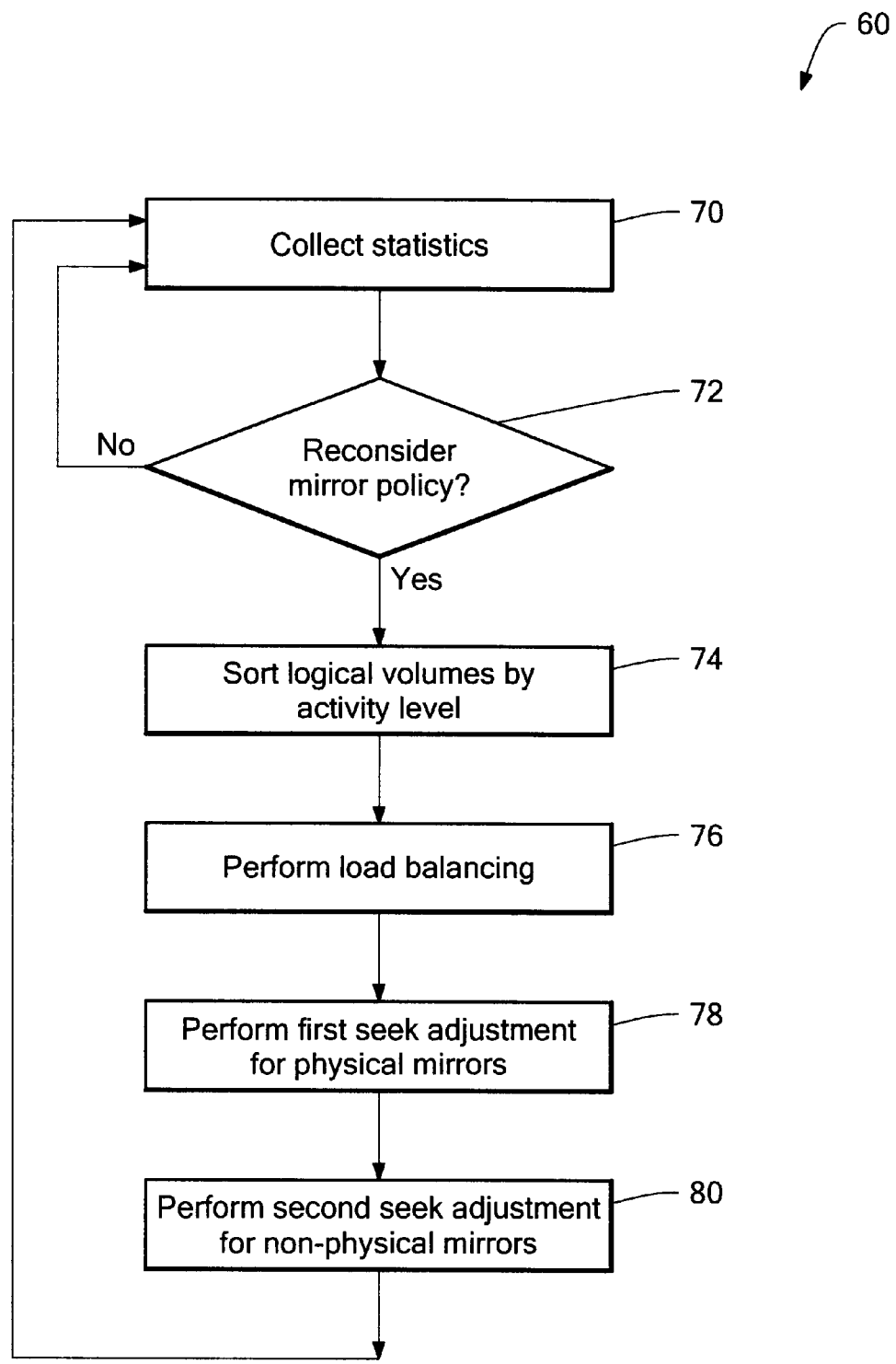
FIG. 4 is a flow diagram illustrating the mirror service policy process for the disk adapter shown in FIG. 3.

Referring to FIG. 4, a flow diagram illustrating the mirror services policy process 60 is shown. The process 60 collects statistics for all logical volumes (step 70). Once the time has come to reconsider the mirror policies (step 72), the statistics for all logical volumes are reviewed and the logical volumes are sorted by activity level (preferably using the approach described in U.S. application Ser. No. 08/936,122) (step 74). Having sorted the logical volumes by activity level, the process 60 performs a load balancing process (step 76) and a first seek adjustment (step 78) process (again, preferably using the approaches described in co-pending application Ser. No. 08/936,122). The seek adjustment attempts to minimize seeks for all logical volume mirrored pairs residing on the same two physical devices (i.e., for physical mirrors). Once these load balancing and seek adjustment processes have been completed, the seek minimizer 62 is invoked to perform a second seek adjustment for non-physical mirrors (step 80). After the second seek adjustment of step 80 has been completed, the statistics collection process resumes (at step 70).

Figure 5:
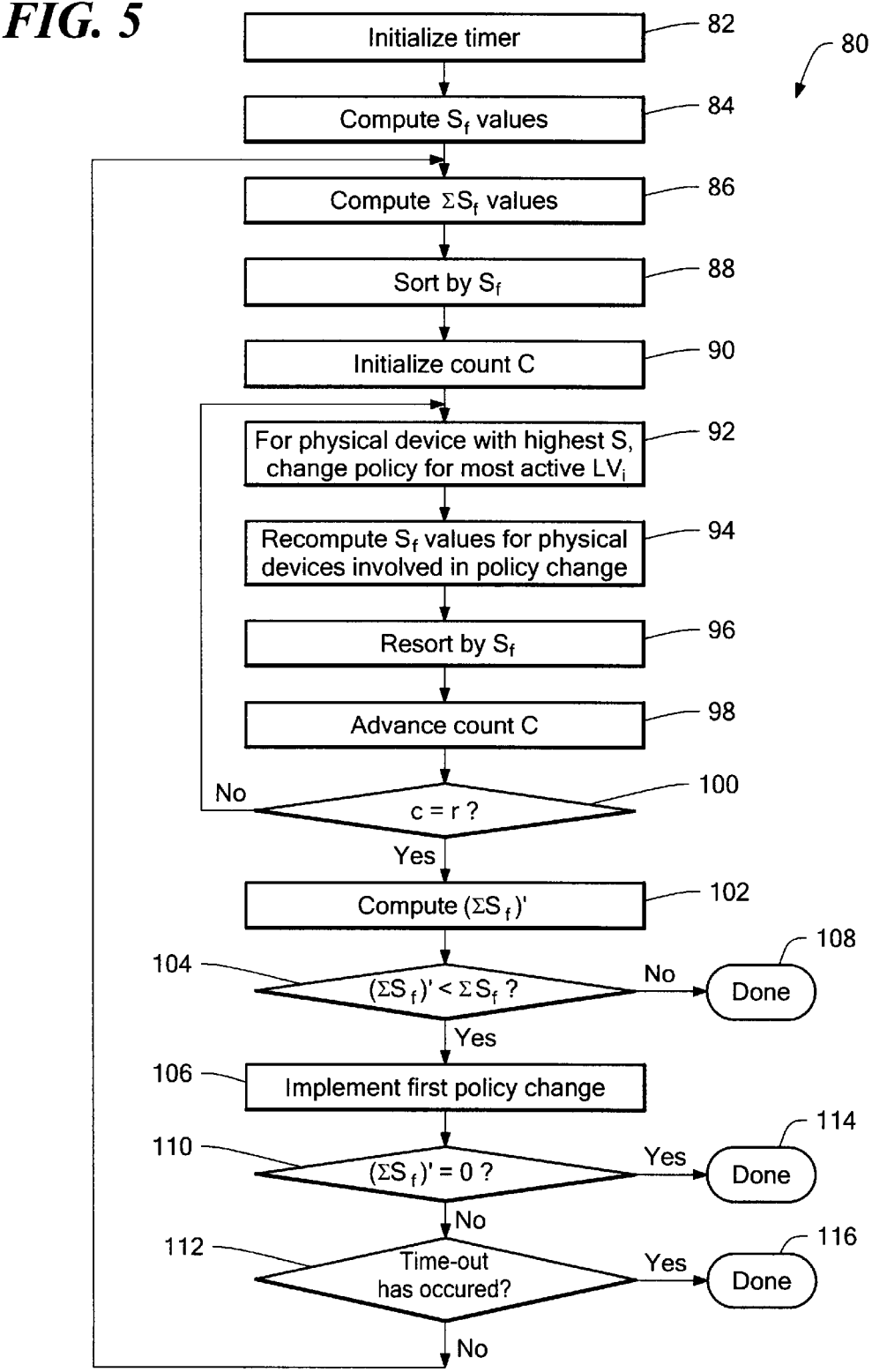
FIG. 5 is a flow diagram illustrating the process of seek adjustment for non-physical mirrors performed by at least one of the disk adapters shown in FIG. 3.

Referring now to FIG. 5, the second seek adjustment process 80 (for or corresponding to the seek minimizer 62 of FIG. 3) is shown. The process 80 begins by initializing a timer programmed to a time interval value (step 82) corresponding to the maximum allowable run time, e.g., 100 ms. The process 80 computes a seek function value S (according to Eq. 1 above) for each of the physical devices (step 84). Once the seek function values have been computed, the sum of all computed S values is computed (step 86) and the physical devices are sorted by the computed S values (step 88). The process 80 then initializes a count "c" (step 90). The count c counts a predetermined threshold number "r" of "simulated" mirror policy changes performed by the process 80, as will be described. It should be noted that the count and time interval values are arbitrary, that is, they are a matter of design choice and thus may be selected in accordance with system performance requirements. In the illustrated embodiment, the count threshold value r is chosen to be to 3.

Using the sorted S values, the process 80 simulates a first policy change for the most active logical volume $LV_i$ on the busiest physical device by selecting the logical value with the highest $a_i$ value on the physical device corresponding to the highest S value, and reassigns the preferred device mirror policy to the corresponding mirrored copy of $LV_i$ residing on a different one of the physical devices (step 92). At this stage, and as indicated above, the process is merely simulating the change, that is, the reassignment has not actually been implemented (by recording the policy "swap" in the DMSP table as described in the above-referenced U.S. application). Rather, the reassignment information, as well as the various computation results, are stored in processor memory. Once the simulated change is complete, the S values for the two physical devices involved in the policy swap are recomputed (step 94). The S values for the physical devices are again sorted (step 96) and the count is advanced by one (step 98). The seek minimizer determines if the count has expired (step 100). If the count has not expired, the seek minimizer repeats steps 92, 94, 96 and 98 until the count expires.

Once the count has expired, the process 80 computes a "new" sum of S values, or, $(\Sigma S)'$, to reflect the changes in S values for the devices involved in policy swaps in each of the simulated changes (step 102). The process determines if the $(\Sigma S)'$ is less than the original $\Sigma S$ (step 104). That is, it determines if the first of the simulated changes as well as the simulated changes likely to follow in future policy update decisions, have a favorable impact on seek activity. If $(\Sigma S)'$ is less than $\Sigma S$, then the process 80 implements the first of the three simulated changes by updating the mirror policy information (i.e., the "preferred device" settings) for the associated logical mirrored pair (step 106). On the other hand, if there is no reduction in the $\Sigma S$ value as a result of the simulated policy changes, then the process is terminated (step 108).

If the first policy change has been made, the process returns to step 86 only if $(\Sigma S)'$ is greater than zero (step. 110) and a time-out has not yet occurred (step 112). If the $(\Sigma S)'$ is equal to zero or a time-out has occurred, the process will terminate (steps, 114 and 116, respectively). By returning to step 86, the process again performs "r" simulated changes for the next policy change iteration, starting with the "new" busiest physical device (i.e., the busiest physical device after the last policy change has been implemented in step 106 and the resorting of the S values, as determined during the previous determination, in step 88), and again compares before and after values of the sum of all S values (as described above) to determine the efficacy of making a mirror policy change for the most active volume on the "new" busiest physical device.

In the preferred embodiment, the process adds to the $(\Sigma S)'$ value a factor of y, where y is equal to the average activity level of the logical volumes, that is, the sum of $a_i/n$ for i=1, 2, 3, ..., n-1, n, where n is the number of logical volumes. This factor is used to ensure that the change is worth making, or, in other words, that it will not merely result in a situation in which the data storage system toggles back and forth between the physical devices.

Figure 6:
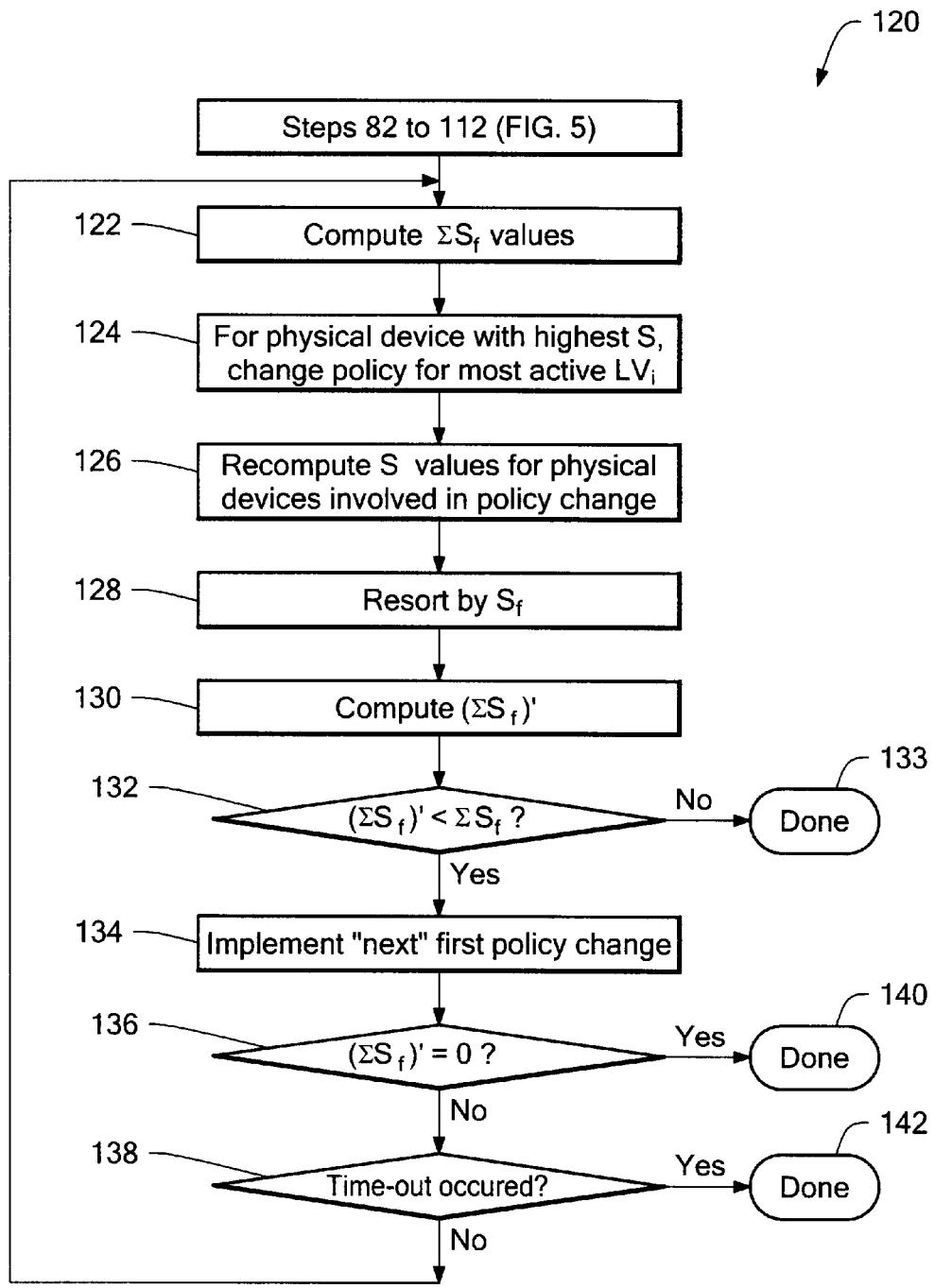
FIG. 6 is a flow diagram illustrating an alternative process of seek adjustment for non-physical mirrors performed by at least one of the disk adapters shown in FIG. 3.

It will be appreciated that the S values which are recomputed during the successive simulated changes may be stored by the processor and used in subsequent iterations. For example, and as illustrated in FIG. 6, an alternative process 120 may perform steps 82 through 112 as shown in FIG. 5 and, if a time out has not occurred at step 112, the process computes the $\Sigma S$ value based on the S values as a result of the implemented policy change (step 122). This sum becomes the new "before" value for the next set of simulated changes to be performed. Because the simulated changes to be performed begin with the new busiest disk after the implemented policy change, the process can skip all but the last of the simulated changes to be performed (that is, c=1, 2, ..., r−1), as these changes were performed in the previous policy change iteration, and proceed directly to the next simulated change in line. Thus, at step 124, and based on the results of the last re-sort operation, the process performs a simulated policy change for busiest physical device by changing the mirror policy for the most active logical volume. The S values for the physical devices involved in the simulated policy change are recomputed (step 126), the S values are re-sorted (step 128) and the $(\Sigma S)'$ is computed by retrieving the S values as updated during the previous iteration (i.e., previous set of r simulated changes) as well as the most recently recomputed S values (from step 126)(step 130). The comparison of S sums is performed as previously described (step 132). If $(\Sigma S)'$ is not less than the $\Sigma S$, then the process is terminated (step 133). If the $(\Sigma S)'$ is less than the $\Sigma S$, the process implements the "next" first policy change (i.e., the oldest of the policy changes to performed and not yet implemented) (step 134). Again, the process determines if either the $(\Sigma S)'$ is equal to zero (step 136) or a time-out has occurred (step 138). In the event that either condition is true, the process will be terminated (steps 140, 142). Otherwise, the process returns to step 122 for the next iteration of policy change simulations.

Thus, for all but the first set of policy change simulations, it may only be necessary to perform the final pass of the simulated changes. For example, if r=3, the process could go directly to the third pass of the simulated changes, as the modified S values of the first and second simulated changes were already computed as part of the second and third simulated changes for the previous iteration.

Figure 7:
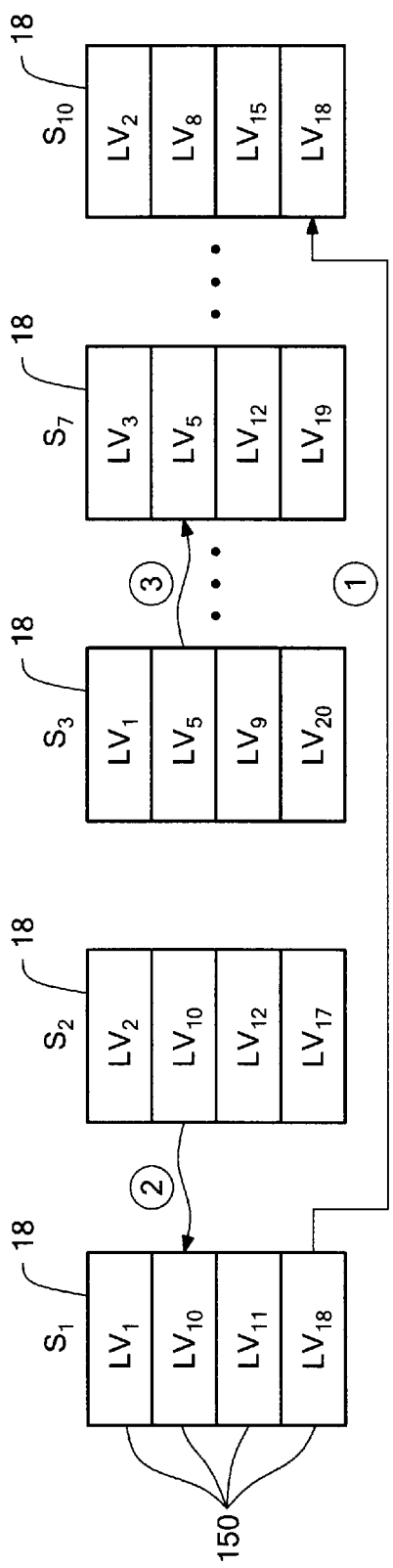
FIG. 7 is an example of three simulated policy changes as performed by the process of seek adjustment for non-physical mirrors shown in FIG. 5.
Figure 8:
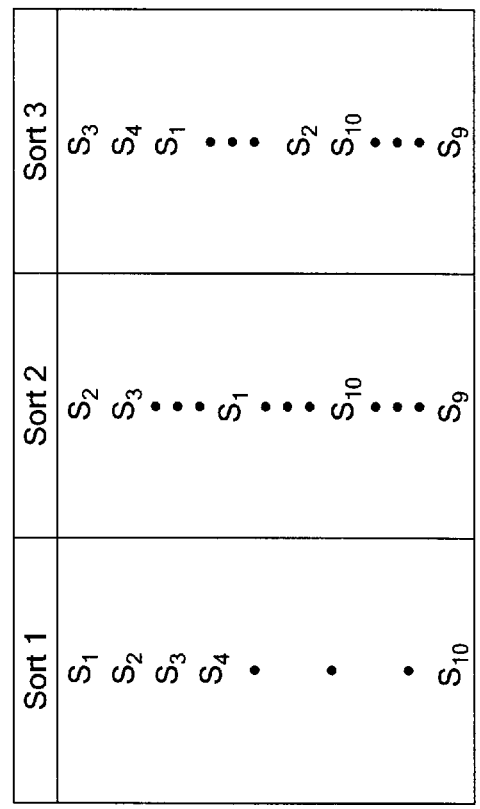
FIG. 8 is a depiction of three seek function value sorts performed in relation to the three simulated policy changes shown in FIG. 6.

FIG. 7 provides an example of a first iteration involving r=3 simulated changes for ten physical devices 18. FIG. 8 illustrates the sorted lists accompanying the simulated changes. Referring to FIG. 7, the physical devices store a plurality of logical volumes 150. In example shown, the physical devices 18 are configured to store four logical volumes apiece, for a total of twenty logical volume mirrored pairs. The logical volume mirrored pairs are distributed throughout the ten physical devices according to a random configuration of the physical devices 18. That is, they are placed on the physical devices in a non-physical mirrored fashion.

Now referring to FIG. 7, together with FIGS. 5 and 8, the physical devices are sorted by S (step 88). In the table of FIG. 8, the devices are sorted in descending order from the most active to least active. In the first sort (sort 1), $S_1$ corresponds to the busiest device and $S_{10}$ the least active. As indicated by the arrow labeled "1" in FIG. 7, (and as described in step 92), a simulated policy swap is performed between the most active volume, $LV_{18}$, on $S_1$, and the device which stores its mirrored copy, that is, $S_{10}$. The S values for $S_1$ and $S_{10}$ are recomputed (step 94) and the S list is resorted (step 96) to produce the "sort 2" list. Because the most active volume no longer contributes to the S value for $S_1$, $S_1$ moves to a lower position on the list and $S_2$ rises to the top of the list as the busiest device.

The second simulated change is performed for $S_2$. As indicated by the arrow labeled "2", a policy swap is made between the most active volume $LV_{10}$ on $S_2$ and its mirrored counterpart on $S_1$. The S values for $S_2$ and $S_1$ are recomputed and the list resorted again.

In "sort 3", as shown in the table of FIG. 8, $S_3$ is now the busiest device. In the final simulated change in this first iteration, indicated by the arrow labeled "3", a policy swap is made between the most active volume $LV_5$ and its copy on $S_7$ and the S values for each of impacted devices $S_3$ and $S_7$ are recomputed.

Although not shown, the S values would again be resorted in preparation for a next iteration. The device at the top of the list in this last sort could, for example, be $S_4$. Once the S sums have been compared, the first policy swap for $S_1$ is implemented as appropriate. If the process 25 continues with the next iteration, it will examine $S_2$, $S_3$ and $S_4$. If the computation results for the simulated policy swaps involving $S_2$ and $S_3$ are still available from the previous iteration, the process need only look at the simulated policy swap for $S_4$.

Returning briefly to FIGS. 2 and 3, the mirror service policy process 60 typically is performed infrequently and is handled as a low priority task in a disk adapter 40 designated the master DA. After execution of the process begins, the process (or portions thereof, such as the seek minimizer) can be executed in fragments so there is no significant time during which the master disk adapter is unavailable to process incoming host-generated requests. The fragment size (if needed) can be selectable and will be determined, for example, in terms of how many logical volumes to examine before resuming, temporarily, normal disk adapter operation. In the event of a failure of the master DA, a designated back-up disk adapter will be responsible for the operation.

Alternatively, the operation (or portions thereof, such as the seek minimizer) can be divided into tasks (e.g., seek function computation, sorting, seek balancing) and those tasks may be distributed among the different disk adapters (DA's). Each DA performs the task (or tasks) to which it is assigned and publishes the results to one or more of the other DAs. This distributed approach does not necessarily reduce the amount of time required to complete the operation, but does reduce the performance impact on any single DA. In addition, or alternatively, certain tasks which lend themselves to the use of parallel processing techniques can be distributed to more than one DA and executed in parallel. For example, a sorting operation could be performed in halves, each half being sorted by a different DA.

Additions, subtractions, and other modifications of the preferred embodiments of the invention will be apparent to those practiced in this field and are within the scope of the following claims.

What is claimed is:

1. A method for adjusting seek activity in a data storage system of physical devices having mirrored logical volumes comprising:
    determining an activity level associated with each of the mirrored logical volumes based on a mirror policy assignment that defines, for each mirrored logical volume and corresponding one of the mirrored logical volumes that mirrors the mirrored logical volume, which mirrored logical volume is preferred to service I/O requests;
    computing seek activity values for the physical devices based on the activity levels associated with the mirrored logical volumes stored on each of the physical devices; and
    using the computed seek activity values to change the mirror policy assignment so as to minimize seek activity for non-mirrored ones of the physical devices.

2. The method of claim 1, wherein the computed seek activity values computed for the physical devices relate a physical device seek activity to the activity level associated with, and distance between, the mirrored logical volumes residing on the physical devices.

3. A method for adjusting seek activity in a data storage system of physical devices having mirrored logical volumes comprising:
    collecting statistics describing at least reading data from the mirrored logical volumes during successive time periods;
    determining from the collected statistics an activity level associated with each of the mirrored logical volumes;
    computing seek activity values for the physical devices based on the activity levels associated with the mirrored logical volumes stored on each of the physical devices, the computed seek activity values relating a physical device seek activity to the activity level associated with, and distance between, the mirrored logical volumes residing on the physical devices;
    using the seek activity values computed for the physical devices to minimize seek activity for non-mirrored ones of the physical devices; and
    wherein using the computed seek activity values comprises:
        computing a sum of the computed seek activity values;
        performing at least one simulated mirror policy change based on the computed sum of the computed seek activity values;
        recomputing the sum of the computed seek activity values using the results of the at least one simulated mirror policy change;
        determining if the recomputed sum of the seek activity values is less than the computed sum of the seek activity values; and
        implementing the at least one simulated mirror policy change.

4. The method of claim 3, wherein performing the at least one simulated mirror policy change comprises:
    selecting a most active one of the physical devices based on the computed seek activity values;
    selecting a most active one of the logical volumes residing on the selected most active one of the physical devices based on the associated activity level, a mirrored copy of the most active one of the logical volumes being stored on another of the physical devices;
    modifying a mirror policy associated with the selected one of the logical volumes to reduce the seek activity value for the selected one of the physical devices; and
    recomputing the seek activity values for the selected one of the physical devices and the another one of the physical devices.

5. The method of claim 4, wherein performing the at least one of simulated policy changes comprises performing a plurality of simulated policy changes.

6. The method of claim 4, wherein performing a plurality of simulated policy changes is repeated a predetermined number of times.

7. The method of claim 6, further comprising:
    performing using the seek activity values until a predetermined time interval has expired.

8. The method of claim 6, further comprising:
    performing using the seek activity values until the recomputed sum is zero.

9. The method of claim 6, further comprising:
    performing using the seek activity values until either a predetermined time interval has expired or the recomputed sum is zero.

10. The method of claim 3, wherein the recomputed sum includes a factor equal to an average of the activity levels of the logical volumes.

11. An apparatus for adjusting seek times in a data storage system of physical devices having mirrored logical volumes comprising a stored computer program in memory instituting the steps of determining an activity level associated with each of the mirrored logical volumes based on a mirror policy assignment that defines, for each mirrored logical volume and corresponding one of the mirrored logical volumes that mirrors the mirrored logical volume, which mirrored logical volume is preferred to service I/O requests;

computing seek activity values for the physical devices based on the activity levels associated with the mirrored logical volumes stored on each of the physical devices; and using the computed seek activity values to change the mirror policy assignment so as to minimize seek activity for non-mirrored ones of the physical devices.

12. The apparatus of claim 11, wherein the computed seek activity values computed for the physical devices relate a physical device seek activity to the activity level associated with, and distance between, the mirrored logical volumes residing on the physical devices.

13. An apparatus for adjusting seek times in a data storage system of physical devices having mirrored logical volumes comprising a stored computer program in memory instituting the steps of collecting statistics describing at least reading data from the mirrored logical volumes during successive time periods;

determining from the collected statistics an activity level associated with each of the mirrored logical volumes;

computing seek activity values for the physical devices based on the activity levels associated with the mirrored logical volumes stored on each of the physical devices, the computed seek activity values relating a physical device seek activity to the activity level associated with, and distance between, the mirrored logical volumes residing on the physical devices;

using the seek activity values computed for each of the physical devices to minimize seek activity for non-mirrored ones of the physical devices; and wherein the program instituted step of using the computed seek activity values comprises:

computing a sum of the computed seek activity values;

performing at least one simulated mirror policy change based on the computed sum of the computed seek activity values;

recomputing the sum of the computed seek activity values using the results of the at least one simulated mirror policy change;

determining if the recomputed sum of the seek activity values is less than the computed sum of the seek activity values; and implementing the at least one simulated mirror policy change.

14. The apparatus of claim 13, wherein the program instituted step of performing the at least one simulated mirror policy change comprises:

selecting a most active one of the physical devices based on the computed seek activity values;

selecting a most active one of the logical volumes residing on the selected most active one of the physical devices based on the associated activity level, a mirrored copy of the most active one of the logical volumes being stored on another of the physical devices;

modifying a mirror policy associated with the selected one of the logical volumes to reduce the seek activity value for the selected one of the physical devices; and recomputing the seek activity values for the selected one of the physical devices and the another one of the physical devices.

15. The apparatus of claim 14, wherein the program instituted step of performing the at least one of simulated policy changes further comprises performing a plurality of simulated policy changes.

16. The apparatus of claim 15, wherein the program instituted step of performing a plurality of simulated policy changes is repeated a predetermined number of times.

17. The apparatus of claim 16, further wherein the program institutes the step of performing using the seek activity values until a predetermined time interval has expired.

18. The apparatus of claim 16, further wherein the program institutes the step performing using the seek activity values until the recomputed sum is zero.

19. The apparatus of claim 16, further wherein the program institutes the step of performing using the seek activity values until either a predetermined time interval has expired or the recomputed sum is zero.

20. A data storage system comprising:

physical devices having mirrored logical volumes stored thereon;

a controller for performing a seek adjustment process to adjust the seek activity of the plurality of physical devices, the controller determining an activity level associated with each of the mirrored logical volumes based on a mirror policy assignment that defines, for each mirrored logical volume and corresponding one of the mirrored logical volumes that mirrors the mirrored logical volume, which mirrored logical volume is preferred to service I/O requests, and computing seek activity values for the physical devices based on the activity levels associated with the mirrored logical volumes; and wherein the controller uses the computed seek activity values to change the mirror policy assignment so as to minimize seek activity for non-mirrored ones of the physical devices.

21. The data storage system of claim 20, wherein the computed seek activity values computed for the physical devices relate a physical storage device seek activity to the activity level associated with, and distance between, the mirrored logical volumes residing on the physical devices.

22. The data storage system of claim 20, wherein the seek adjustment process is executed in fragments.

23. The data storage system of claim 20, wherein the controller comprises device adapters for performing the seek adjustment process and wherein the controller assigns responsibility for performing different tasks associated with the seek adjustment process to different ones of the device adapters.

24. The data storage system of claim 23, wherein the controller assigns responsibility for performing at least one of the different tasks to different ones of the device adapters.

25. The data storage system of claim 23, wherein the different tasks are executed in fragments.

26. A data storage system comprising:

physical devices having mirrored logical volumes stored thereon;

a controller for performing a seek adjustment process to adjust the seek activity of the plurality of physical devices, the controller determining an activity level associated with each of the mirrored logical volumes and computing seek activity values for the physical devices based on the activity levels associated with the mirrored logical volumes;

wherein the controller uses the seek activity values computed for the physical devices to minimize seek activity for non-mirrored ones of the physical devices;

wherein the controller comprises device adapters for performing the seek adjustment process and wherein the controller assigns responsibility for performing different tasks associated with the seek adjustment process to different ones of the device adapters; and wherein the different tasks are executed in fragments, the size of the fragments being selectable based on the number of logical volumes to be examined during the seek adjustment process.

27. A controller for controlling transfer of data to and from physical devices having mirrored logical volumes comprising:

at least one device adapter for performing a seek adjustment process for adjusting the seek activity of the physical devices, the at least one device adapter determining an activity level associated with each of the mirrored logical volumes based on a mirror policy assignment that defines, for each mirrored logical volume and corresponding one of the mirrored logical volumes that mirrors the mirrored logical volume, which mirrored logical volume is preferred to service I/O requests and computing seek activity values for the physical devices based on the activity levels associated with the mirrored logical volumes; and wherein the at least one device adapter uses the computed seek activity values to change the mirror policy assignment so as to minimize seek activity for non-mirrored ones of the physical devices.

* * * * *

UNITED STATES PATENT AND TRADEMARK OFFICE
CERTIFICATE OF CORRECTION

PATENT NO. : 6,611,896 B1
DATED : August 26, 2003
INVENTOR(S) : Robert S. Mason, Jr.

It is certified that error appears in the above-identified patent and that said Letters Patent is hereby corrected as shown below:

Column 1,
Line 16, delete "data storage" and replace with -- data storage system --.

Column 2,
Line 6, delete "fur" and replace with -- for --.

Column 6,
Line 13, delete "-reference" and replace with -- referenced --.

Column 8,
Line 22, delete "performed" and replace with -- be performed --.

Column 10,
Line 50, delete "of simulated" and replace with -- of the simulated --.

Column 11,
Lines 3 and 28, delete "comprising" and replace with -- comprising: --.
Lines 5 and 30, delete "of" and replace with -- of: --.

Signed and Sealed this

Sixth Day of July, 2004

JON W. DUDAS
*Acting Director of the United States Patent and Trademark Office*